United States Patent [19]

Ryan

[11] Patent Number: 4,779,686

[45] Date of Patent: Oct. 25, 1988

[54] PLOUGHSHARE ASSEMBLY HAVING HOLDER ROTATABLY ENGAGEABLE WITH APERTURE IN PLOUGHSHARE

[76] Inventor: Austin T. Ryan, 19 Hewitt Street, Warracknabeal, Victoria, Australia

[21] Appl. No.: 849,372

[22] Filed: Apr. 8, 1986

[30] Foreign Application Priority Data

Apr. 9, 1985 [AU] Australia ............................ PH00061
May 24, 1985 [AU] Australia ............................ PH00723
Aug. 20, 1985 [AU] Australia ............................ PH02037

[51] Int. Cl.$^4$ ............................................ A01B 15/02
[52] U.S. Cl. .................................... 172/730; 172/753; 172/762; 403/348; 403/353
[58] Field of Search ............... 172/720, 721, 724, 730, 172/733, 749, 750, 751, 753, 762, 763; 403/348, 353

[56] References Cited

U.S. PATENT DOCUMENTS

| | | | |
|---|---|---|---|
| 1,328,740 | 1/1920 | Huggins | 172/751 X |
| 2,712,280 | 7/1955 | Peoples | 172/751 X |
| 4,333,536 | 6/1982 | Ryan | 172/721 |
| 4,497,141 | 2/1985 | Jarby | 403/348 X |
| 4,605,335 | 8/1986 | Otrusina | 403/348 |

FOREIGN PATENT DOCUMENTS

| | | |
|---|---|---|
| 65635/80 | 12/1980 | Australia . |
| 91056/82 | 12/1983 | Australia . |
| 20249/83 | 5/1984 | Australia . |
| 31248 | 7/1981 | European Pat. Off. ............ 172/749 |
| 2146072 | 4/1973 | Fed. Rep. of Germany ...... 403/353 |
| 2252496 | 5/1974 | Fed. Rep. of Germany ...... 403/353 |
| 12522 | of 1902 | United Kingdom ................ 172/720 |
| 1365720 | 9/1974 | United Kingdom ................ 403/353 |

Primary Examiner—Richard T. Stouffer
Attorney, Agent, or Firm—Steele, Gould & Fried

[57] ABSTRACT

A ploughshare assembly includes a ploughshare and a support for the ploughshare. A pair of opposed internal edges defines a recess in the ploughshare. A holder formation on the support includes a foot portion and a pair of grooves adjacent the foot to receive the aforesaid internal edges of the ploughshare so that when the ploughshare is in its working position on the support the foot engages underside the ploughshare and retains it in place. An aperture in the ploughshare behind the internal edges is wider than the separation of the edges and is dimensioned to pass the foot when the ploughshare is sufficiently rotated relative to the support and so allows detachment of the ploughshare from the support. A resilient latch detachably mounted to the support is releasably positionable to engage a detent face on the ploughshare to prevent excessive forward movement of the ploughshare with respect to the support. The support has a forward face which is divided at a ridge into a pair of surfaces which trail rearwardly outwardly from the ridge. The ridge and surfaces serve to divide the material stream thrown up by the share and substantially smoothly deflecting this srteam over the surfaces and past the support. An embodiment of the ploughshare is of broadly triangular configuration and comprises a body portion and a pair of convergent replaceable marginal strips which are secured to the body portion and define respective forward ground working edges.

14 Claims, 5 Drawing Sheets

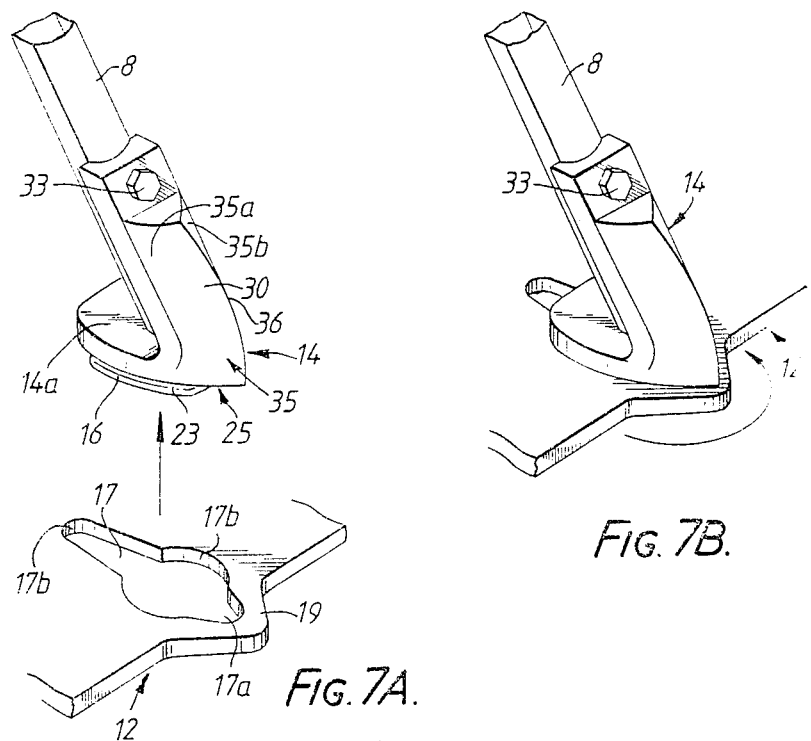
FIG. 7A.
FIG. 7B.
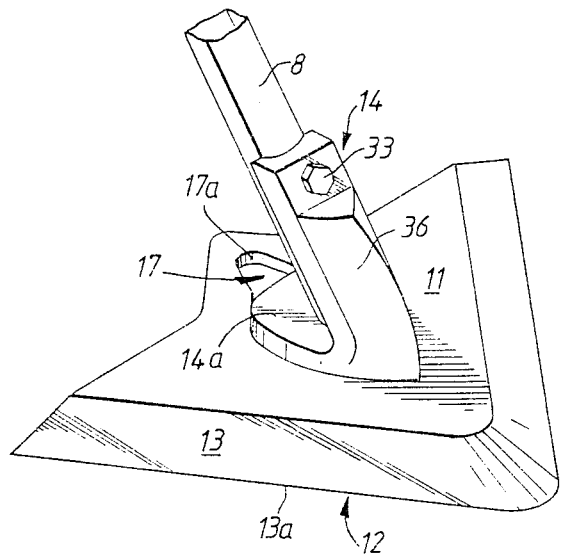
FIG. 7C.

PLOUGHSHARE ASSEMBLY HAVING HOLDER ROTATABLY ENGAGEABLE WITH APERTURE IN PLOUGHSHARE

This invention relates to a ploughshare support and associated ploughshare, and to a ploughshare assembly incorporating the support and ploughshare.

Recent interest among some farmers in minimum tillage cultivation and seeding has been met in part by the development of cultivators employing wide, nearly flat chisel ploughshares, known as sweep shares. Each share is mounted to a respective depending tyne or strap and will typically be one of a large number carried by a single machine. Shares of any kind regularly require replacement because of wear or other damage and it is important that this operation can be carried out speedily and with minimum effort—without compromising the security of the individual share mountings. Ploughshares are typically either bolted to their tines or straps, or secured by a firm press fit which may be set or broken by several good blows with a hammer. Shares fastened by the latter method are known as "knock-on" shares; arrangements of this general class are shown, e.g., in Australian patent No. 533505 corresponding to 65635/80 and patent applications Nos. 91056/82 and 20249/83.

In a more recent mounting arrangement for the sweep shares of minimum tillage cultivators, an upstanding U-section socket welded to the share receives and is fastened to the depending tine. In practice, however, the share can be subjected in use to strong torsional forces about the tine, especially because of its width: these forces are occasionally sufficient to splay out the socket and the loosened share subsequently falls off the tine. The farmer may be unaware of this for some time: a serious disadvantage if the cultivator is being operated as a simultaneous seeder.

Other prior disclosed arrangements include the provision of an intermediate adaptor separate from both the share and the depending tine, for securing shares to a variety of mountings, and the use of a horizontal wedged engagement between adaptor and share. The latter concept is shown, e.g., in U.S. Pat. No. 3,104,724 to Pollock and both concepts are disclosed in U.S. Pat. Nos. 3,752,236, 4,078,866 and 4,333,536. The Pollock reference also shows a lever able to be pivoted by a nut and thread device to clamp the share on the depending tine. The lever engages a rear inside edge of the share. Another locking device comprising a transverse tie fixed to the share behind its support is shown in U.S. Pat. No. 3,752,236 to Foster.

The aforementioned U.S. Pat. No. 4,333,536 to J. W. Ryan discloses a vertical dovetail engagement between the share and the adaptor in addition to the horizontal wedged engagement.

U.S. Pat. Nos. 2,117,461 and 1,499,531 show forward upstanding faces—the former on an intermediate "duck foot" supporting an earthworking blade, the latter on an elongate integral socket of a sweep share—which are divided by a ridge into two rearwardly outwardly trailing surfaces.

OBJECTS AND SUMMARY

It is an object of the invention to provide a novel ploughshare assembly which affords a reliable mounting for the share but is nevertheless suited to easy replacement of the share when worn.

More particularly, the invention provides a ploughshare assembly comprising:

a ploughshare having one or more forward ground-working edges;

a support for the ploughshare;

a recess defined by a pair of opposed internal edges on said ploughshare;

a holder formation on said support including a foot portion and a pair of grooves adjacent said foot to receive said internal edges of the ploughshare so that, when the ploughshare is in its working position on the support the foot engages under the ploughshare and retains it in place; and an aperture in said ploughshare behind said internal edges, which aperture is wider than the separation of said edges and is dimensioned to pass said foot when the ploughshare is sufficiently rotated relative to the support and so allow detachment of the ploughshare from the support.

Preferably, said aperture is dimensioned to pass said foot when the ploughshare is rotated through substantially 180°.

The foot and aperture advantageously comprise complementary substantially circular segments.

The holder formation may include a tail segment which locates under the ploughshare adjacent said aperture, even when the ploughshare is moved from said working position to a foremost position on the holder formation.

The invention further provides a ploughshare comprising:

one or more forward ground working edges;

a recess defined by a pair of opposed internal edges on said ploughshare; and an aperture in the ploughshare behind said internal edges which aperture is wider than the separation of said edges and is arranged to pass a foot of a support for the ploughshare, such foot engaging under the ploughshare at said edges when the ploughshare is in its working position on the support.

In accordance with the invention, there is still further provided a ploughshare assembly comprising:

a ploughshare and an upstanding support therefor;

a detent face on said ploughshare; and resilient latch means detachably mounted to said support releasably positionable to engage said detent face to prevent excessive forward movement of the ploughshare with respect to the support during use thereof. Such latch means preferably comprises a bent length of wire or rod and is advantageously releasable for its engagement position by resultant deflection of the latch means.

The invention also affords a ploughshare wherein said marginal strips are welded to complementary peripheral edge segments of said body portion and are replaceable by cutting the respective welds.

The support may be a unitary shank of a tine or strap, or an adapter arranged to be separately fastened to a tine or strap.

BRIEF DESCRIPTION OF THE DRAWINGS

The invention will be further described, by way of example only, with reference to the accompanying drawings, in which:

FIGS. 7A-7C are a sequence of somewhat schematic views showing how the ploughshare is mounted to the adapter;

DETAILED DESCRIPTION

Figure 1:
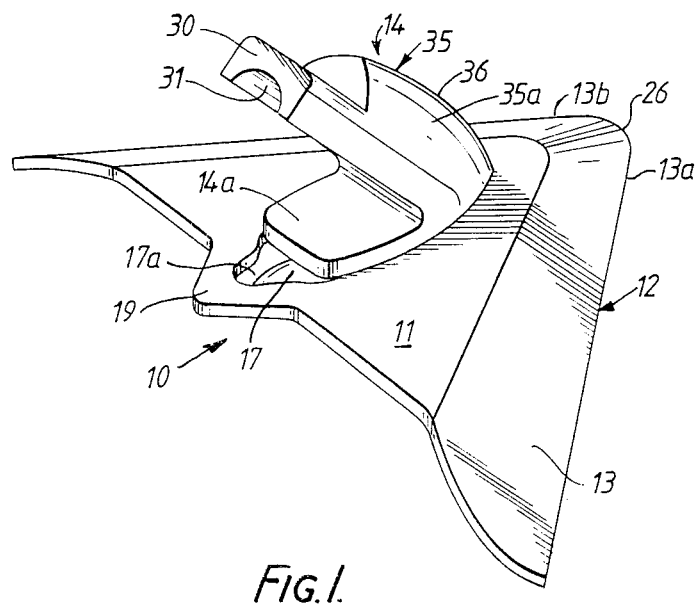
FIG. 1 is a perspective view of a first embodiment of ploughshare assembly in accordance with the invention, in which the support is an adaptor for securing a sweep share to an existing depending tine.
Figure 2:
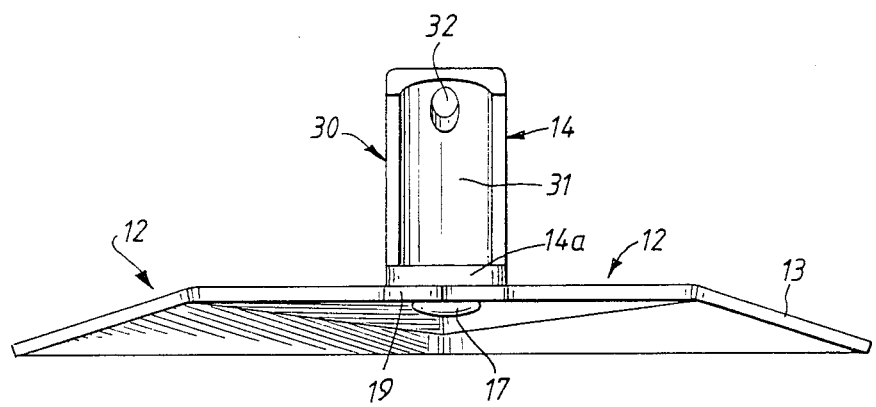
FIGS. 2 and 3 are a rear elevation and underneath view respectively of the assembly of FIG. 1.
Figure 3:
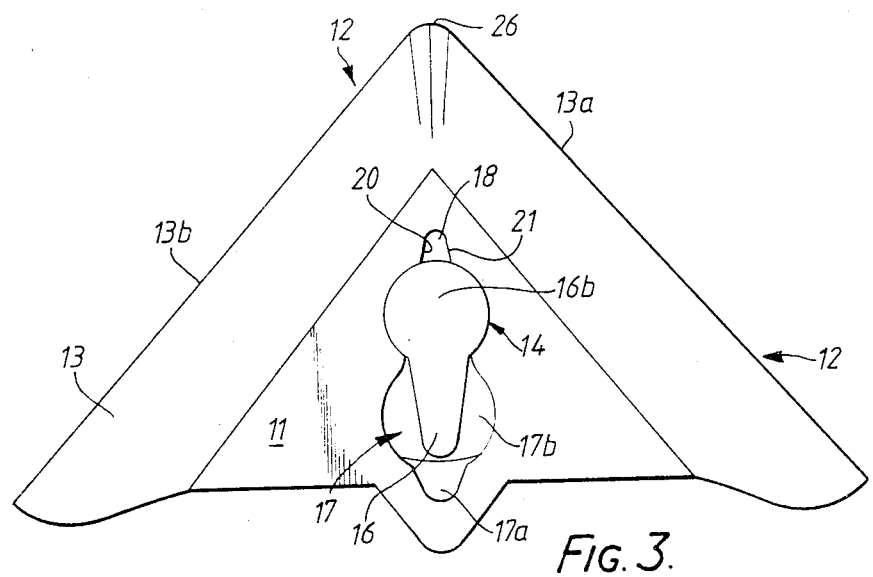

The ploughshare assembly 10 illustrated in FIGS. 1 to 3 includes a sweep share 12 and an adapter 14 by which the share is mounted in use to a depending tine (not shown) of a cultivator frame. The assembly will typically be one of a substantial number of such assemblies spaced across the frame, perhaps in two or more offset rows. The tine would generally depend somewhat forwardly and be provided with a pair of bolt holes which are traditionally employed for securing a conventional ploughshare directly to the tine.

The share 12 is detachably mounted to adapter 14 by means of a wedge-like engagement between a recess 18 (FIGS. 3 and 4) in the share, defined by a pair of forwardly convergent internal edges 20, 21, and a holder formation 25 (FIGS. 5 and 6) on the adapter comprising a pair of lateral grooves 22, 23 also forwardly convergent to seat edges 20, 21. Grooves 22, 23 are arranged to either side of a land 24 integrally bridging the body of the adapter to a foot 16 which is wider and longer than land 24, and relatively thinner so as to have minimal depth under the share.

Share 12 is a wide angled chisel ploughshare which is nearly flat but slightly upwardly convex, as best seen in FIGS. 1 and 2. This configuration is of a known type and is especially suitable for minimum tillage cultivation. The share has a broadly triangular flat center 11 with an outwardly downwardly inclined margin 13 to a pair of ground working edges 13a, 13b. Edges 13a, 13b trail outwardly and rearwardly from a rounded strengthened tip 26. Recess 18 is part of an aperture 17 through the center 11 which is closed about its whole periphery, and in particular at its rear by a v-shaped co-planar projection 19.

Adapter 14 includes a rearwardly concave shank portion 30 which is rearwardly integrally upstanding from holder formation 25 so that its rear surface 31 is complementary to the forward surface of the tine. A bolt aperture 32 is formed in shank portion 30 for attaching the adapter to a tine. The forward face 35 of the adaptor is convexedly shaped to form a ridge 36 which divides this face into a pair of surfaces 35a, 35b which trail rearwardly outwardly from the ridge. The ridge 36 and surfaces 35a, 35b serve to divide the material stream thrown up by the share and substantially smoothly deflect this stream over surfaces 35a, 35b past the adaptor.

Figure 4:
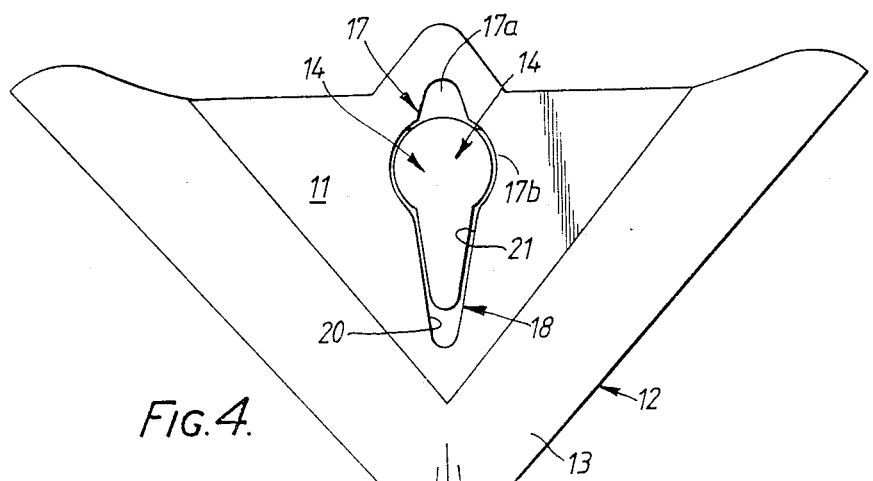
FIG. 4 is an underneath view of the ploughshare as it is being mounted, in a reversed disposition, to the adapter.
Figures 5, 6:
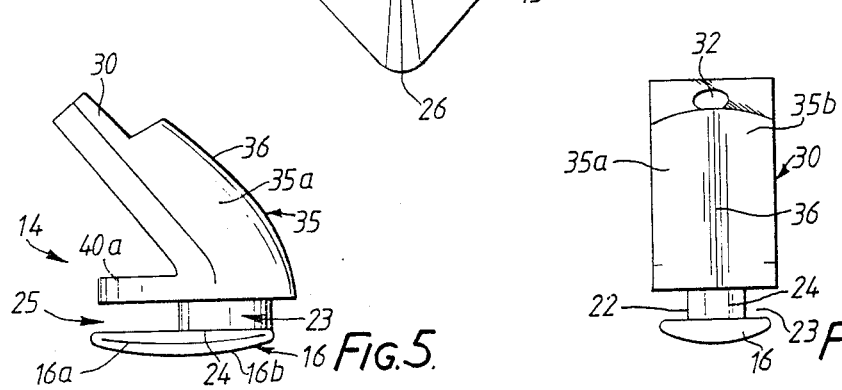
FIGS. 5 and 6 are side and front elevations of the adapter.

Separation of the share from the adapter during normal use is substantially prevented by engagement of a tail segent 16a of foot 16 under projection 19, even when the adapter is at its relatively foremost position. In the relatively most rearward position of the adapter, land 24 locates in a notch 17a at the rear of aperture 17 and thereby holds the two against relative rotation. For facilitating mounting of the share to the adapter, and then subsequent disengagement for replacement of the share when worn, foot 16 is dimensioned to fit through aperture 17 when the share is turned through 180° to a reversed disposition. In particular, tail segment 16a is tapered to complement and pass through tapered recess portion 18 of aperture 17 (FIGS. 4 and 7A). The center segment 17b of aperture 17 between recess 18 and notch 17a is of circular profile and of slightly greater diameter than a complementary circular front segment 16b of adaptor foot 16.

For use of the inventive shares with an existing cultivator frame with multiple tines, the farmer initially and substantially permanently mounts adapters 14 to the respective tine shanks 8 with bolts 33. As already foreshadowed, each share 12 is fitted by bringing each share up to its adapter in a reversed disposition (FIG. 7A) and passing recess 18 about foot 16 (FIG. 7B). The share is then rotated through 180° and moved rearwardly so as to clamp edges 20, 21 into grooves 22, 23 (FIG. 7C). A few blows with a hammer secure the fitting.

When it is desired to replace a worn share, which in some conditions may be a quite frequent requirement, each share is easily disengaged from its wedged seat with a suitable hammer, turned back through 180° and lifted off the adapter.

The length of adapter foot tail segment 16a is arranged relative to aperture 17 so that when the share is rearmost and locked by wedging onto the adaptor, the tail segment is under the v-shaped projection 19 behind the aperture. Thus, if the share is knocked even slightly forwardly the combined engagement of the tail under projection 19 and the front foot part 16b under the margins of the aperture prevent any unintended separation of the share: indeed the share can only be separated if rotated through substantially 180°. When the share is foremost, and the front part 16b of foot 16 is in register with aperture center part 17b, the tight fit of projection 19 between tail segment 16a and a trailing flange 14a of adapter body prevents any tilting of the share adequate to disengage it from the adapter. In this position, also, notch 17a substantially prevents rotation of the share on the adapter.

In operation of a cultivator fitted with multiple ploughshare assemblies 10, each share is advantageously preceded by a coulter disc. The share assembly and disc may be mounted as a single unit on an individual stump-jump mechanism The disc makes an initial cut of say 10 cm in the ground. The share 12 slices through the ground about 5 cm below ground level, successfully achieving separation and tillage without the wholesale turning over of large clods as occurs in conventional ploughing, and without burying straw, grass or stubble on top. A subsurface layer of soil passes smoothly over the top surface of the share and about the adapter and tine. The result tends to be a narrow furrow behind the assembly and it is into this furrow that seed may be directed from a trailing sowing tube. If desired, a depending spout or other element may then follow, extending to about the depth of the disc cut, that is to about 10 cm, and the fertilizer laid below the seed at this depth. Because of the minimum tillage and turning, the soil tends to fall back over the seed and fertilizer after the assembly has passed.

It will be appreciated that the share is positively engaged on the tine and is not susceptible to falling off due to twisting or other forces. On the other hand, it is a simple, quick operation to remove a worn share with a few hammer strikes for replacement by a new share. It will also be noted that the shares are well suited to storage and transport in stacks as they have no protruding lugs or sockets. When stacked, apertures 17 can be put to separate advantage by, e.g. tying the shares together with wire passed through the apertures.

Figure 8:
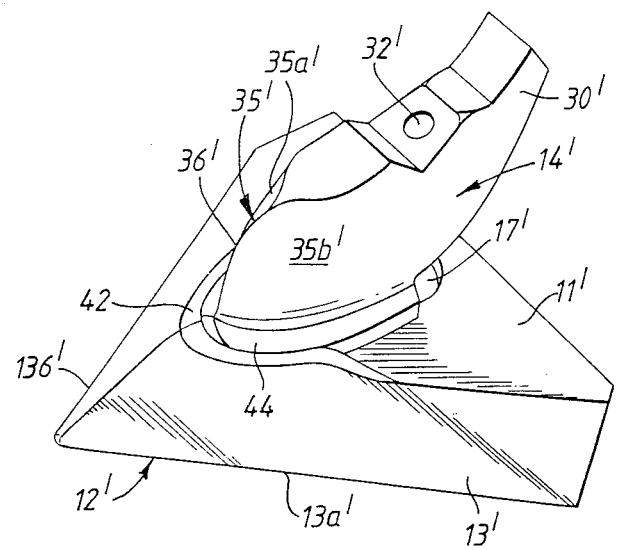
FIGS. 8 and 9 are top and bottom perspective views of a second embodiment of ploughshare assembly according to the invention, FIG. 9 being cut away to show rear latch means.
Figure 9:
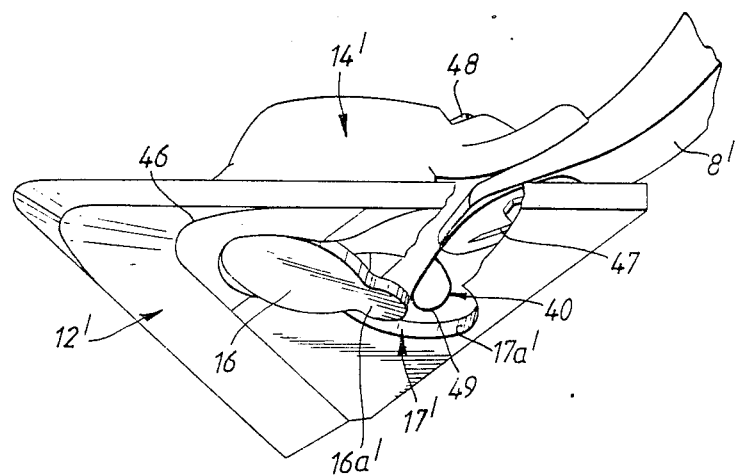
Figure 10:
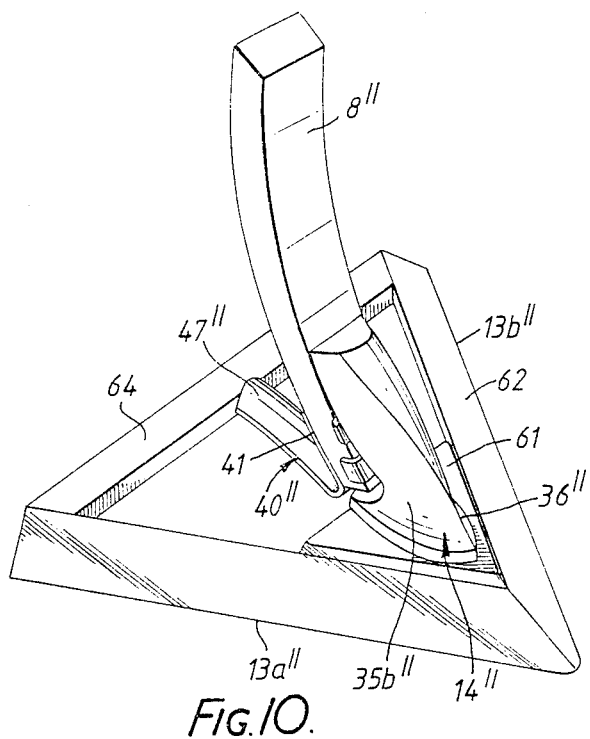
FIGS. 10 and 11 are top and bottom perspective views of a third embodiment of the invention.

FIGS. 8 and 9, depict a second embodiment of assembly which differs from the first primarily in the absence of projection 19 and in the provision of a latch 40'. The share 12' is also integrally provided with a raised shoulder 42 in its top surface defining a curved seat for the land 44 of adaptor 14' just above grooves 22', 23' and with an underside internal rim 46 defining a curved seat for foot 16'. Latch 40 is provided to guard against separation of the parts in certain soil conditions and comprises a length of wire bent (FIG. 9) to define a hook 47 secured by bolt 48 and a rearwardly extending portion in the form of an eye 49 that lies within aperture 17'. The back edge 17a' of this aperture then constitutes a detent face engageable by latch 40 to prevent excessive forward movement of the ploughshare during use thereof.

Figure 11:
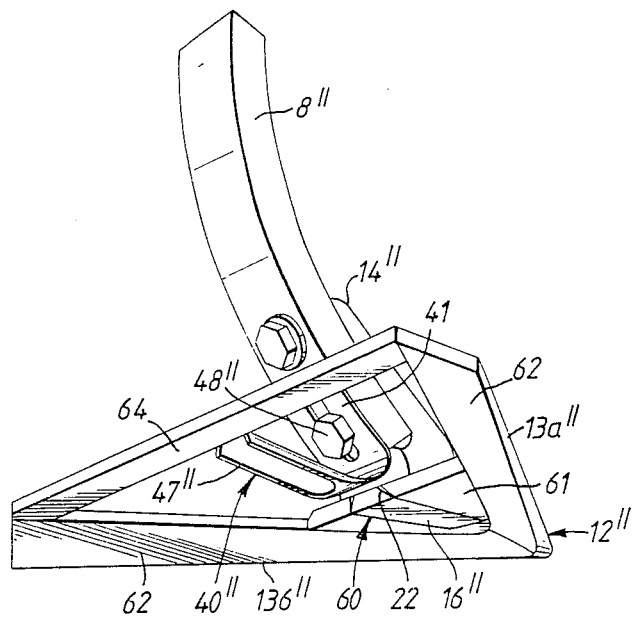

FIGS. 11 and 12 depict a still further embodiment of the invention. Here there is no rotational engagement between the parts. Attention is drawn however to the vertical dovetail engagement 60 (FIG. 11) between the foot 16" and a triangular center piece 61 of the ploughshare. Ground working edges 13a", 13b" are formed on respective replaceable marginal strips 62 welded to centerpiece 61 and to a rear connecting cross-piece 64. Latch 40" in this case is a bent strip of spring steel singly ribbed for strength secured by bolt 48". It may be easily released by engaging a suitable tool under the rearwardly extending portion 47' of the latch to resiliently deflect the spring steel strip by lifting portion 47' until it clears rear cross-piece 64. Latch 40" is adjustable vertically by virtue of a bifurcated upper end 41 of the spring steel strip.

In an alternative arrangement (not illustrated) latch 40' may comprise a single length of steel rod bent to form an upstanding U-shaped hook portion secured by bolt 48" and a rearwardly extending prong with a shoulder in front of crosspiece 64 and a tail above the crosspiece. The tail may be lifted to disengage the shoulder from the crosspiece and so allow detachment of the share.

I claim:

1. A ploughshare assembly comprising:
   a ploughshare having at least a center member and one forward ground-working edge;
   a support for the ploughshare;
   a recess in said center member, said recess defined by a pair of opposed internal edges on said ploughshare;
   a holder formation on said support including a foot and a pair of grooves adjacent said foot to receive said internal edges of the ploughshare so that when the ploughshare is in its working position on the support the foot engages the underside of the ploughshare and retains it in place; and
   an aperture in said center member of said ploughshare behind said internal edges, which aperture is wider than the separation of said edges and is dimensioned to have said foot pass therethrough when the ploughshare is rotated substantially 180° relative to the support and so allow detachment of the ploughshare from the support, said aperture and said recess being so positioned relative to each other, and said internal edges and said grooves being so sized with respect to each other that after said foot is initially passed through said aperture to engage said foot with said ploughshare and said ploughshare is rotated substantially 180°, said at least one forward edge of said ploughshare is moved rearwardly toward said grooves and said edges are engaged with said grooves.

2. A ploughshare assembly according to claim 1, wherein said support comprises a discrete adapter having means for securing the adapter to a depending tine.

3. A ploughshare assembly according to claim 1, wherein said ploughshare has a raised shoulder in its top surface defining a curved seat for a complementary land of said support located above said grooves.

4. A ploughshare assembly according to claim 1, wherein said ploughshare has an underside internal rim defining a curved seat for said foot.

5. A ploughshare assembly according to claim 1, wherein said foot and said aperture comprise complementary substantially circular segments.

6. A ploughshare assembly according to claim 1, wherein said foot further comprises a tail segment which locates under the ploughshare adjacent said aperture, even when the ploughshare is moved from said working position to a foremost position on the holder formation.

7. A ploughshare assembly according to claim 1, wherein said internal edges and grooves are configured to provide a vertical dovetail engagement between the ploughshare and the support.

8. A ploughshare assembly according to claim 1, wherein said internal edges and said grooves are respectively convergent so as to provide a horizontal wedge engagement between the ploughshare and the support.

9. A ploughshare assembly according to claim 1, further comprising:
   a detent face on said ploughshare; and
   resilient latch means detachably mounted to said support releasably positionable to engage said detent face to prevent excessive forward movement of the ploughshare with respect to the support during use thereof.

10. A ploughshare assembly according to claim 9, wherein said resilient latch means comprises a bent length of wire or rod.

11. A ploughshare assembly according to claim 9 wherein said latch means is releasable from its engagement position by resilient deflection of the latch means.

12. A ploughshare assembly according to claim 1, wherein said support has a forward face which is divided at a ridge into a pair of surfaces which trail rearwardly outwardly from said ridge, said ridge and surfaces serving to divide the material stream thrown up by the share and substantially smoothly deflecting this stream over said surfaces and past said support.

13. A ploughshare according to claim 1, which has a raised shoulder in its top surface defining a curved edge for a complementary land of said support.

14. A ploughshare according to claim 1, wherein said ploughshare has an underside internal rim defining a curved seat for said foot.

* * * * *